(12) United States Patent
Goleski et al.

(10) Patent No.: US 8,187,141 B2
(45) Date of Patent: May 29, 2012

(54) PLANET PINION CARRIER FOR A GEARSET

(75) Inventors: Gregory D. Goleski, Rochester Hills, MI (US); Mark W. Rosselot, Saline, MI (US); Mark E. Briscoe, Howell, MI (US); Bryant L. Poynter, Redford, MI (US); John W. Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 12/257,679

(22) Filed: Oct. 24, 2008

(65) Prior Publication Data

US 2010/0105515 A1    Apr. 29, 2010

(51) Int. Cl.
*F16H 57/08* (2006.01)
(52) U.S. Cl. ...................................................... 475/331
(58) Field of Classification Search .................. 475/331, 475/324, 338, 318, 339, 340, 341, 342
See application file for complete search history.

(56) References Cited

U.S. PATENT DOCUMENTS

| | | | |
|---|---|---|---|
| 3,527,121 A * | 9/1970 | Moore | 475/338 |
| 3,939,736 A * | 2/1976 | Morin | 475/338 |
| 3,939,739 A * | 2/1976 | Kotsakis | 81/90.9 |
| 4,445,337 A | 5/1984 | McCreary | |
| 4,718,304 A | 1/1988 | Ivy | |
| 4,813,299 A | 3/1989 | Hamane et al. | |
| 5,156,575 A * | 10/1992 | Garrett | 475/59 |
| 6,422,971 B1 * | 7/2002 | Katou et al. | 475/331 |
| 6,743,148 B2 * | 6/2004 | Hayabuchi et al. | 475/331 |
| 7,033,301 B2 * | 4/2006 | Kimes | 475/338 |
| 7,100,756 B2 | 9/2006 | Kimes et al. | |
| 7,118,507 B2 | 10/2006 | Tomita et al. | |
| 7,223,198 B2 | 5/2007 | Kimes et al. | |
| 7,559,867 B2 * | 7/2009 | Seki et al. | 475/146 |
| 7,641,581 B2 * | 1/2010 | Yamazaki | 475/252 |

* cited by examiner

*Primary Examiner* — David D Le
*Assistant Examiner* — David J Hlavka
(74) *Attorney, Agent, or Firm* — David B. Kelley, Esq.; MacMillan, Sobanski & Todd, LLC

(57) ABSTRACT

A carrier assembly for an automatic transmission includes a first plate, a second plate spaced along an axis from the first plate, a third plate spaced axially from the first plate and the second plate by angularly spaced legs, the third plate being formed with angularly spaced recesses. Short pinions, supported on the first plate and the third plate, each has a major diameter sized to move between at least two of the legs along a chordal path into one of the recesses during installation in the carrier. Long pinions, supported on the first plate and the second plate, each has a major diameter sized to move between at least two of the legs along a radial path into one of the recesses during installation in the carrier.

18 Claims, 6 Drawing Sheets

PLANET PINION CARRIER FOR A GEARSET

BACKGROUND OF THE INVENTION

1. Field of the Invention

The invention relates generally to a planetary gearset of an automatic transmission for a motor vehicle. More particularly the invention pertains to a planet pinion carrier of the planetary gearset.

2. Description of the Prior Art

An automatic transmission may be used in an automotive powertrain with a large diesel engine having a high torque capacity engine of about 700 lb-ft, and with a smaller gasoline engine having a lower torque capacity of about 400 lb-ft. With such a dramatic difference in torques, the carrier of a planetary gear set for the transmission, such as a Ravigneaux gearset, must be able to accommodate a variable number of planet pinions, the number being compatible with the torque capacity of the engine.

Generally the pinions of Ravigneaux gearset require installation from the inside out. Inside-out installation requires manual assembly or a complicated automated assembly process that risks quality and cost.

Other known techniques for dealing with a wide range of torque capacity in a planetary gearset involve using multiple gear sizes and multiple numbers of gear teeth to provide torque capacity flexibility. These features require additional investment cost and packaging changes.

A need exists in the industry for a pinion carrier that can accommodate a wide range of torque capacity by using either six or eight pinions, each pinion having the same size and number of teeth. Preferably the carrier can be integrated with a rocker one-way clutch to minimize production and assembly cost.

SUMMARY OF THE INVENTION

A carrier assembly for an automatic transmission includes a first plate, a second plate spaced along an axis from the first plate, a third plate spaced axially from the first plate and the second plate by angularly spaced legs, the third plate being formed with angularly spaced recesses. Short pinions, supported on the first plate and the third plate, each has a major diameter sized to move between at least two of the legs along a chordal path into one of the recesses during installation in the carrier. Long pinions, supported on the first plate and the second plate, each has a major diameter sized to move between at least two of the legs along a radial path into one of the recesses during installation in the carrier.

A method for installing the long pinion and short pinion in the carrier includes the steps of moving the short pinion along a chordal path and into one of the recesses, inserting a short pinion shaft through a first hole in the first plate, a second hole in the third plate aligned with the first hole and through a bore in the short pinion, moving the long pinion along a radial path and into one of the recesses, and inserting a long pinion shaft through a third hole in the first plate, a fourth hole in the second plate aligned with the third hole and through a bore in the long.

The carrier can accommodate either six or eight planet pinions, which can be easily installed using planetary gearset assembly equipment. The carrier allows both the long pinion and short pinion to be installed in a lateral or radial direction from the outside inward. The carrier maintains the same angle of installation for both sets of pinions, regardless of the pinion count, so that the carrier can be built on the same assembly stations.

Integration of a capable rocker one-way clutch was accomplished using separate materials for the front side of the carrier. The rocker plate section is a high density FLNC 4408, while the portion containing the pinion holes is a medium density, easy to machine FC-0208-50 material. The two piece construction of the front portion of the carrier is optimized for strength, density cost and machinability. Overall, the carrier is constructed of four powder metal components sintered together.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
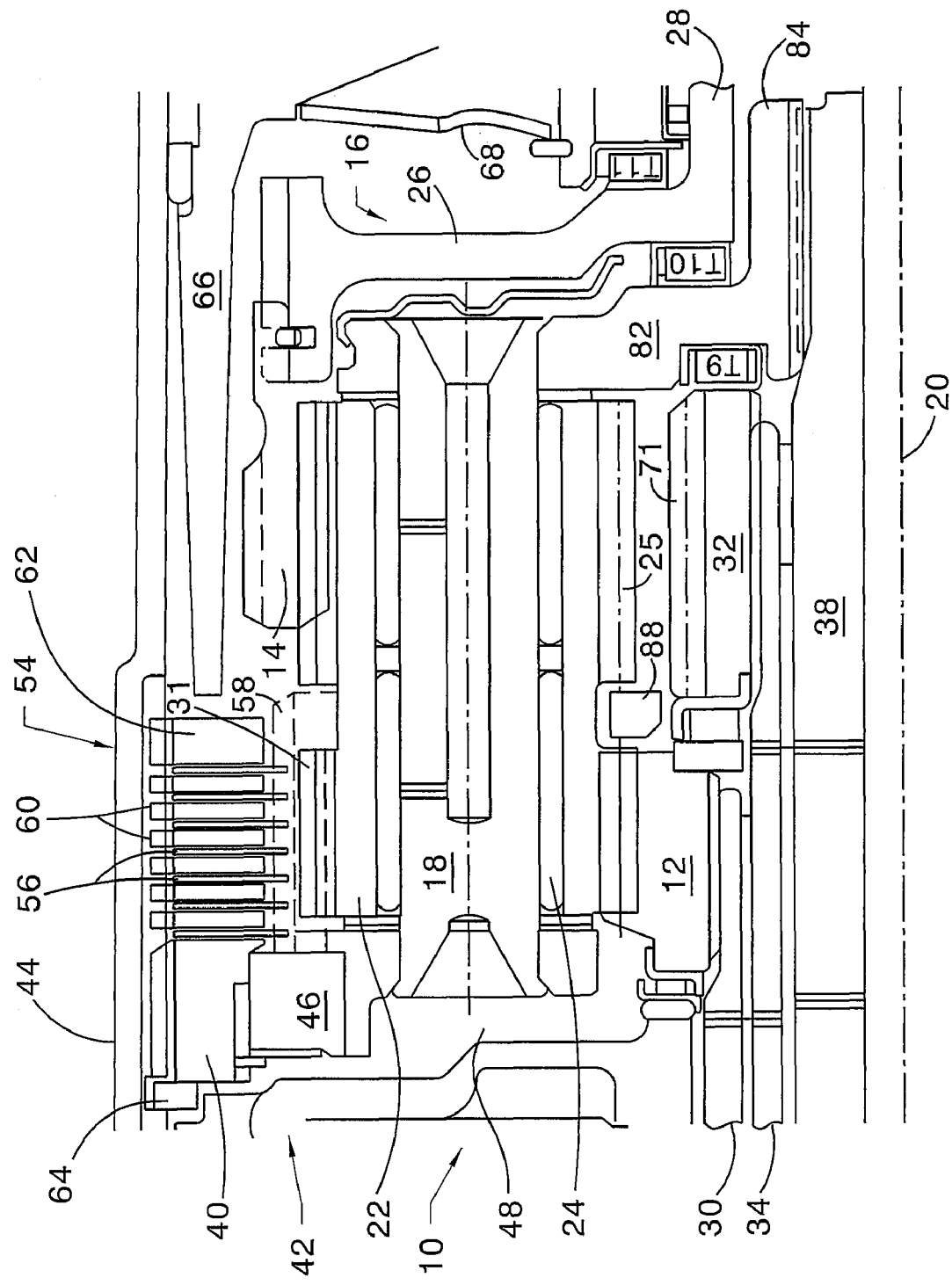
FIG. 1 is a partial cross sectional view above a central axis showing a Ravigneaux gearset for an automatic transmission.

Referring now to the drawings, FIG. 1 illustrates a Ravigneaux gearset 10 that includes a first sun gear 12, ring gear 14, carrier 16, planet pinion shafts 18 spaced mutually about axis 20 and supported on carrier 16, and a set of long pinions 22, each long pinion 22 being supported by a bearing 24 on a pinion shaft 18.

Figure 2:
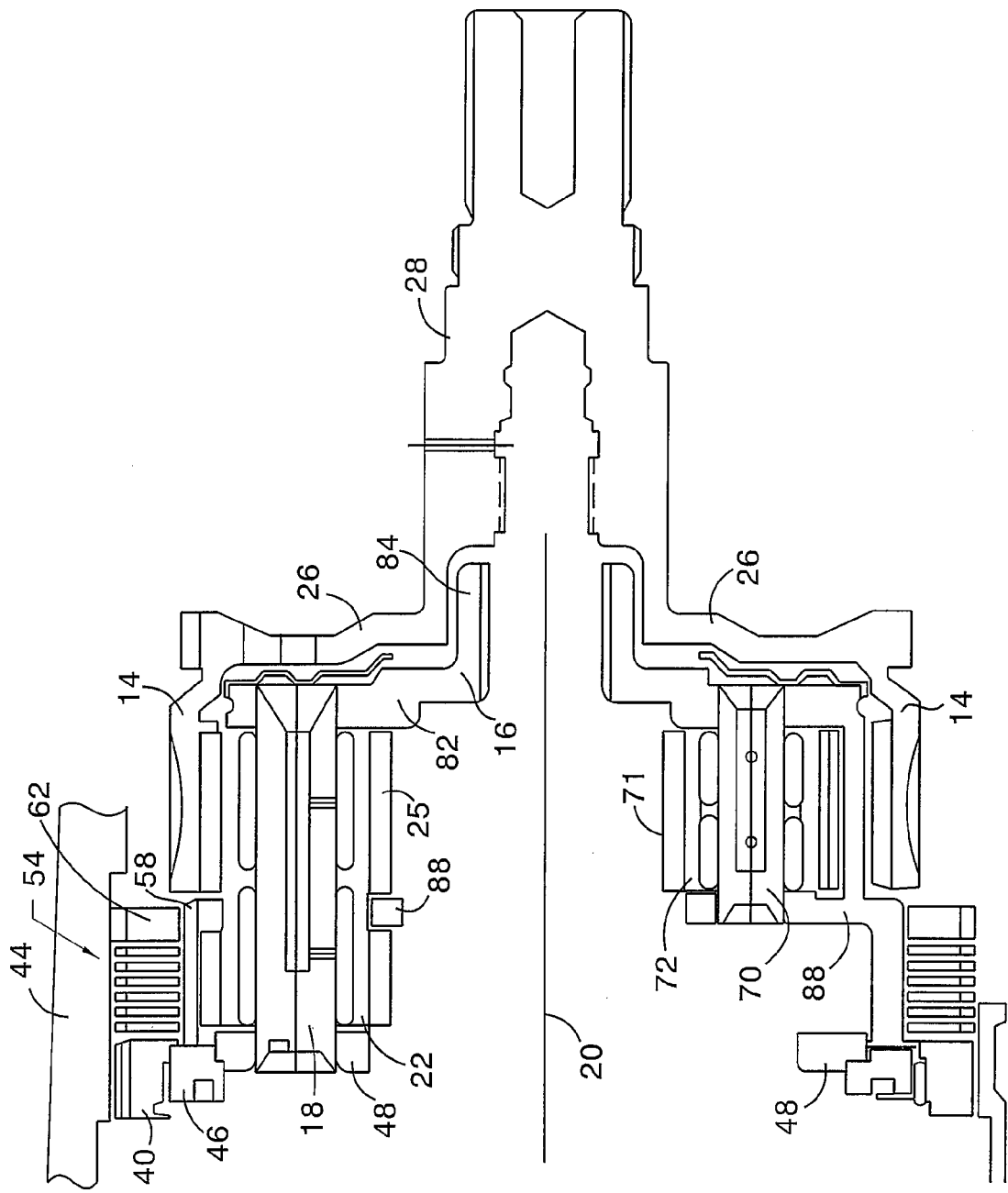
FIG. 2 is cross sectional view of the gearset of FIG. 1 showing both sides of the central axis.

Ring gear 14, which meshes with teeth 25 of pinions 22, is driveably connected by a disc 26 to an output shaft 28. Sun gear 12, which is secured by a spline to a shaft 30, meshes with teeth 31 of pinions 22. A second sun gear 32, which is secured by a spline to a shaft 34, meshes with a second set of planet pinions 72, as shown in FIG. 2. End plate 82 of carrier 16 is secured by a spline 84 to an intermediate shaft 38.

The outer race 40 of a one-way clutch (OWC) 42 is splined to the transmission casing 44. The inner race 46 of OWC 42 is supported on and secured to an end plate 48, which is a component of carrier 16. A series of rockers, located in an annular space between the races 40, 46, alternately driveably connect and disconnect carrier 16 to the casing 44.

A hydraulically actuated brake 54 includes friction discs 56, connected at their inner radial surface by a spline 58 formed on the radial outer surface of the web 88 of carrier 16. Plates 60, splined at their outer radial surface to casing 44, each alternate with discs 56. A pressure plate 62 is connected by a spline at its outer radial surface to casing 44. A snap ring 64, secured to the casing 44 against displacement along axis 20, is located adjacent the outer race 40. A piston 66 moves along axis 20 in response to hydraulic pressure in a servo cylinder, in which piston 66 is located, and the force of a Belleville spring 68. When the servo cylinder is pressurized, piston 66 moves leftward and forces the friction discs 56 and plates 60 into mutual frictional contact. The force of piston 66 is transmitted by the friction discs 56, plates 50, and the outer race 40 of OWC 42, and snap ring 64 to casing 44. Spring 68 returns piston 66 to the disengaged position shown in FIG. 1, when pressure in the servo cylinder is vented.

Figure 4:
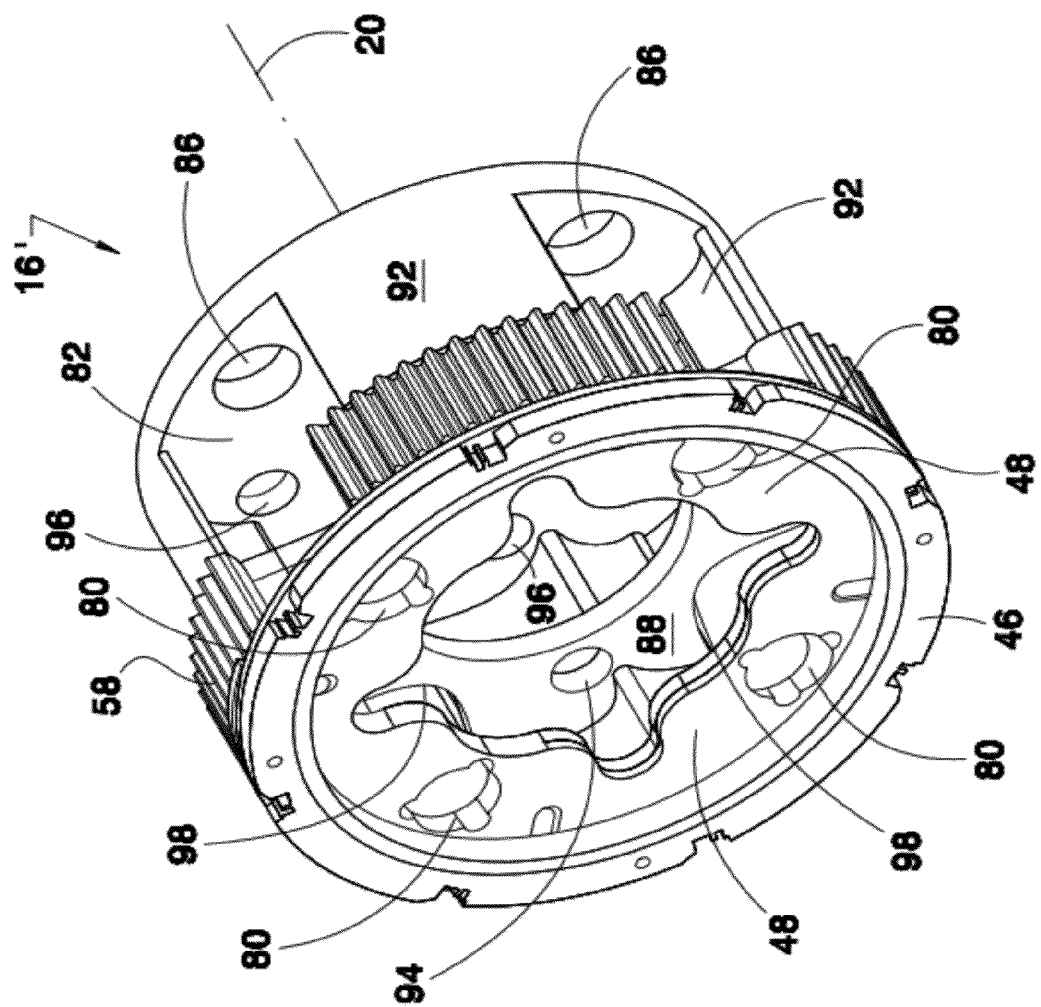
FIG. 4 is a perspective view of the pinion carrier adapted to support eight pinions.
Figure 5:
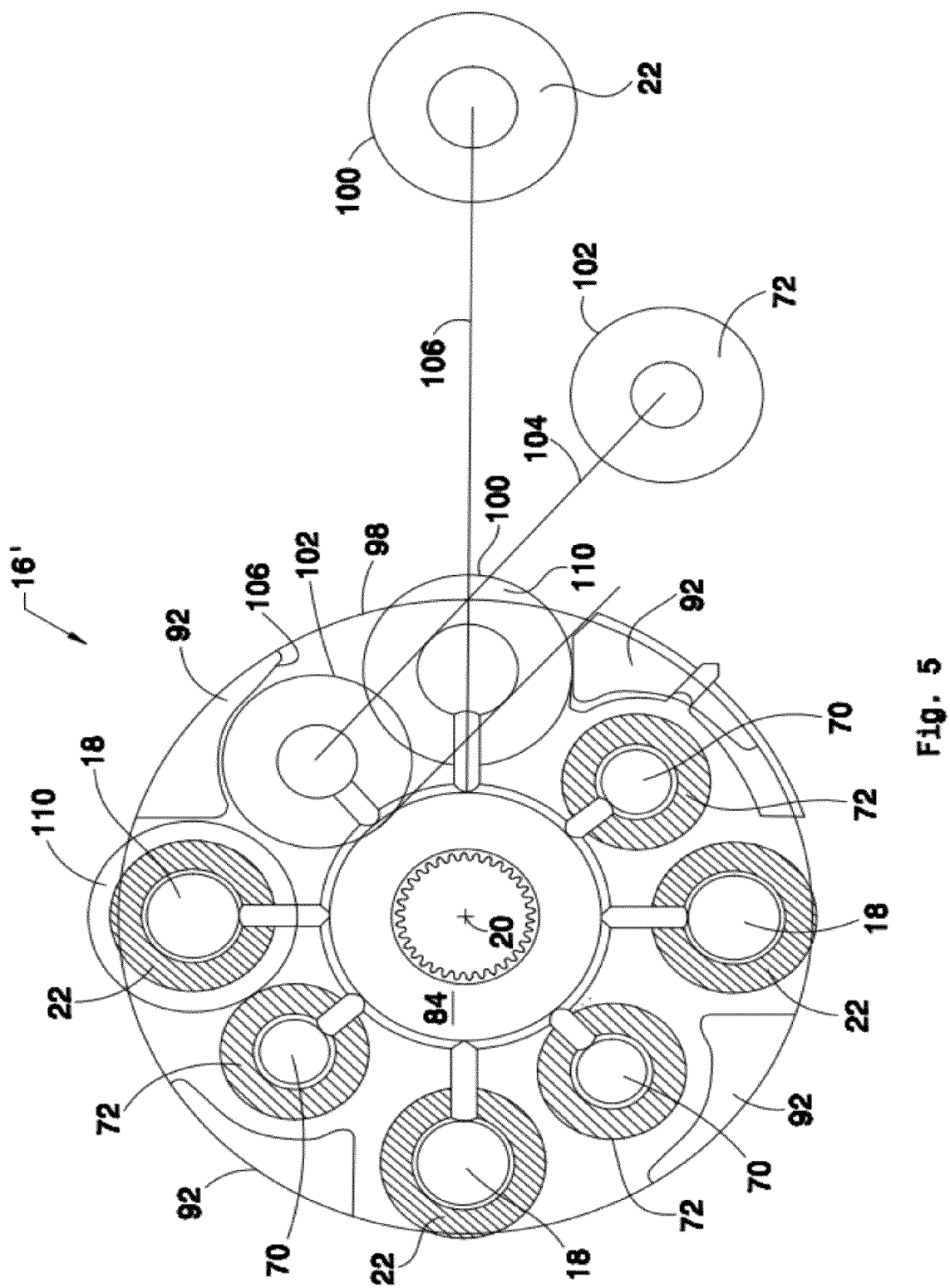
FIG. 5 is an end view of the carrier of FIG. 4.

As shown in FIGS. 4 and 5, gearset 10 may include four long planet pinion shafts 18 arranged in an annular space in carrier 16, four long planet pinions 22 supported respectively on a pinion shaft 18, four short planet pinion shafts 70 parallel to shafts 18, and four short planet pinions 72, each supported on a short pinion shaft.

Figure 3:
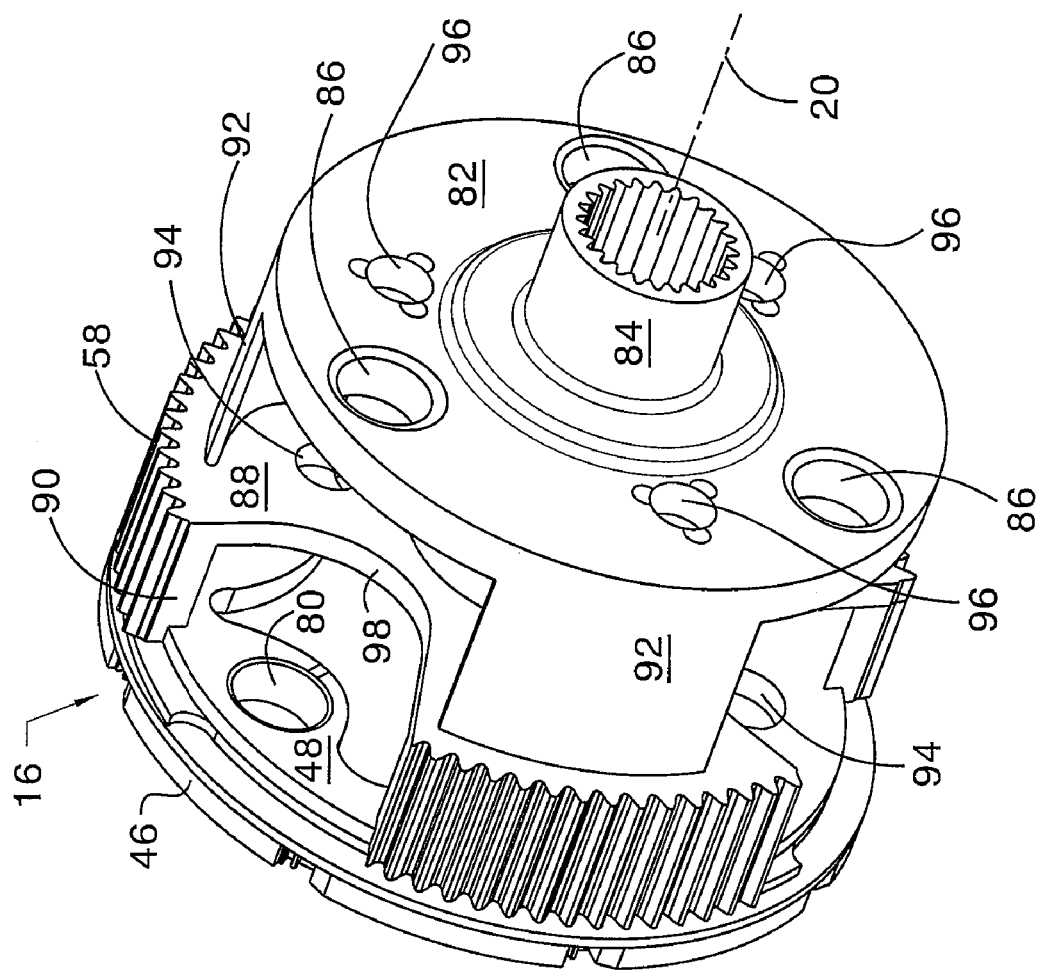
FIG. 3 is a perspective view of the pinion carrier adapted to support six pinions.
Figure 6:
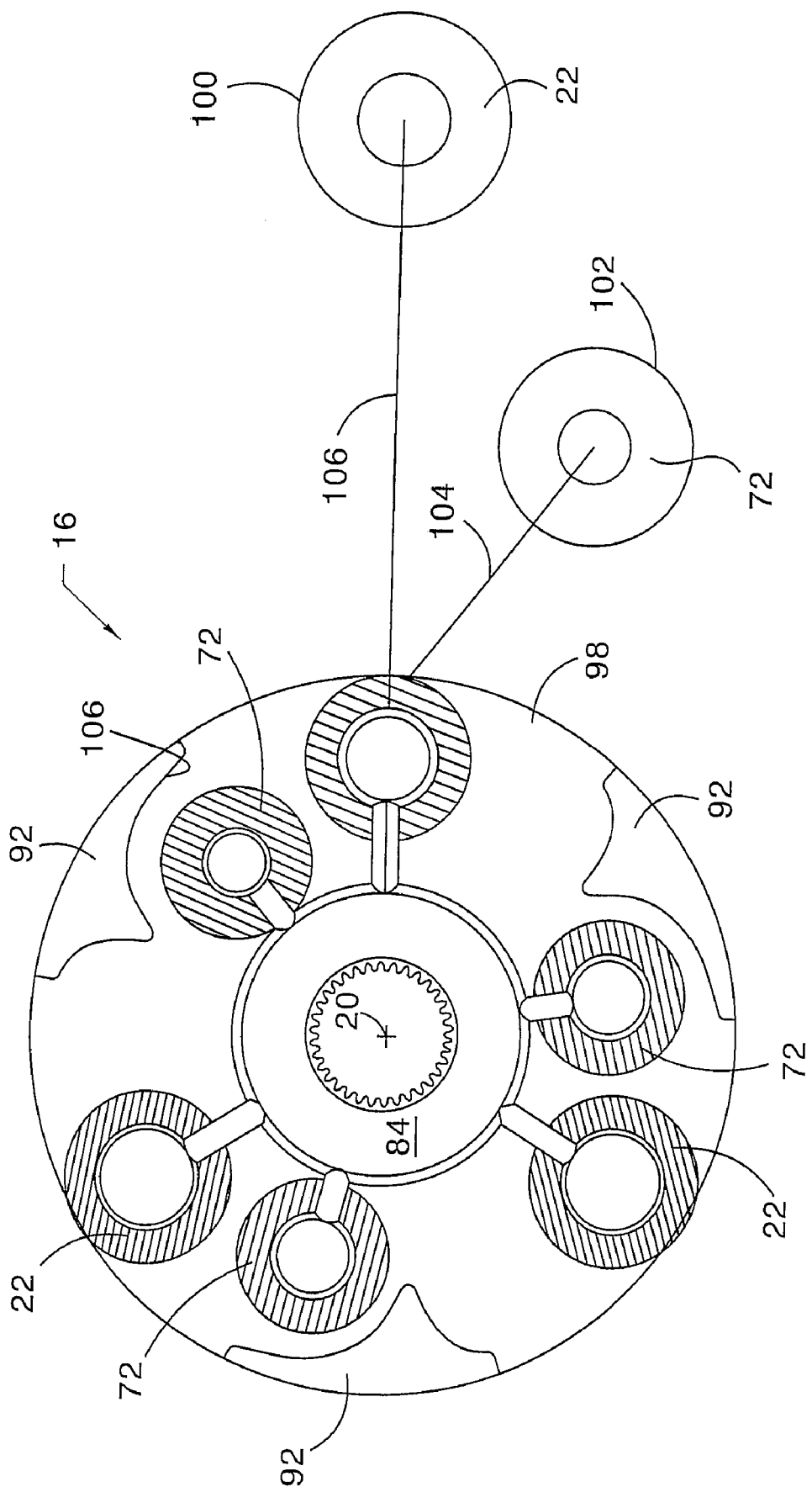
FIG. 6 is an end view of the carrier of FIG. 3.

Alternatively, as shown in FIGS. 3 and 6, gearset 10 may include three long planet pinion shafts 18 arranged in an annular space in carrier 16, three long planet pinions 22 supported respectively on a pinion shaft 18, three short planet pinion shafts 70 parallel to shafts 18, and three short planet pinions 72, each supported on a short pinion shaft 70. Sun gear 32 meshes with the short planet pinions 72, which mesh also with the long planet pinions 22.

FIG. 3 shows that end plate 48 of a carrier 16 is formed with three holes 80 angularly spaced about axis 20, and end plate 82 at the opposite end of the carrier near a hub 84 is formed with three holes 86 aligned with holes 80. Each of three long pinion shafts 18 is supported on a pair of holes 80, 86. A web 88, spaced axially by three legs 92 from plates 48, 82, respectively, is formed with three holes 94 angularly spaced about axis 20, and end plate 82 is formed with three holes 96 aligned with holes 94. Each of three short pinion shafts 70 is supported on a pair of holes 94, 96. Web 88 is formed with local recesses 98 at three angularly spaced locations aligned with holes 80, 86, thereby providing access for the short pinions 72 to be installed in carrier 16 from a lateral direction with respect to axis 20 and along a chordal path.

Similarly, FIG. 4 shows that end plate 48 of a carrier 16' may be formed with four holes 80 angularly spaced about axis 20, and end plate 82 at the opposite end of the carrier 16' is formed with four holes 86 aligned with holes 80. Each of four long pinion shafts 18 is supported on a pair of holes 80, 86. A web or third plate 88, spaced axially by four legs 92 from plates 48, 82, respectively, is formed with four holes 94 angularly spaced about axis 20, and end plate 82 is formed with four holes 96 aligned with holes 94. Each of four short pinion shafts 70 is supported on a pair of holes 94, 96. Web 88 is relieved locally at four angularly spaced locations 98 to provide access for the long pinions 22 and short pinions 72 to be installed in carrier 16' from a lateral direction.

FIG. 5 illustrates a method for installing the long pinions 22 and short pinions 72 in carrier 16'. The circumference 100 corresponding to the major diameter of the long pinions 22 and the circumference 102 corresponding to the major diameter of the short pinions 72 are shown overlapping, thereby representing mutually meshing engagement of the teeth of pinions 22, 72. Each short pinion 72 is inserted into carrier 16 along a chordal line 104 that passes between the legs 92, which are spaced mutually by a distance that accommodates the major diameter 102. The inner surface 106 of legs 92 is shaped to permit the short pinions to become aligned with holes 94, 96. Each short pinion shaft 70 is then passed through holes 94, 96 and the bore in the respective short pinion 72 and is staked to end plate 82 and web 88.

Similarly, each long pinion 22 is inserted into carrier 16' along a radial line 106, through the recess 98, and into alignment with holes 80, 86. Each long pinion shaft 18 is then passed through the recess 98 in web 88, holes 80, 86 and the bore in the long pinion 22 and is staked to plate 48. Carrier 16' is installed in the transmission such that sun gear 12 meshes with the teeth of pinions 22, sun gear 32 meshes with the teeth 71 of pinions 72, and ring gear 14 meshes with the teeth 110 of pinions 22.

FIG. 6 illustrates a method for installing the long pinions 22 and short pinions 72 in carrier 16. Each short pinion 72 is inserted into carrier 16 along chordal line 104, which are spaced mutually by a distance that accommodates the major diameter 102. The inner surface 106 of legs 92 is shaped to permit the short pinions 72 to become aligned with holes 94, 96. Each short pinion shaft 70 is then passed through holes 94, 96 and the bore of the respective short pinion 72 and is staked to plate 82 and web 88. Each long pinion 22 is inserted into carrier 16 along radial line 106, through the recess 98, and into alignment with holes 80, 86. The long pinion shaft 18 is then passed through holes 80, 86 and the bore in the respective long pinion 22 and is staked to plate 48. Carrier 16 is installed in the transmission such that sun gear 12 meshes with the teeth 25 of pinions 22, sun gear 32 meshes with the teeth 71 of pinions 72, and ring gear 14 meshes with the teeth 25 of pinions 22.

In accordance with the provisions of the patent statutes, the preferred embodiment has been described. However, it should be noted that the alternate embodiments can be practiced otherwise than as specifically illustrated and described.

The invention claimed is:

1. A transmission carrier, comprising:
   integral first and second plates including legs, the second plate having recesses;
   a third plate;
   short pinions supported on the first and second plates, each short pinion overlappable circumferentially by one of the legs;
   long pinions supported on the first and third plates, the first and second plates further include an axial spline that spaces the third plate from the second plate.

2. The carrier of claim 1 further comprising:
   long pinion shafts directed axially and supported on the first plate and the third plate, each long pinion being supported on one of the long pinion shafts; and
   short pinion shafts parallel to the long pinion shafts, supported on the first plate and the second plate, each short pinion being supported on one of the short pinion shafts.

3. The carrier of claim 2 wherein each long pinion shaft extends through one of the recesses, and each long pinion extends through one of the recesses.

4. The carrier of claim 1 further comprising:
   a clutch secured to one of the first plate and the third plate for producing a one-way drive connection between a casing and said one of the first plate and third plate.

5. The carrier of claim 1 wherein each long pinion includes a first set of gear teeth for engaging a first sun gear, and a second set of gear teeth for engaging a ring gear.

6. The carrier of claim 1 wherein each short pinion includes a third set of gear teeth for engaging a second sun gear.

7. A carrier for an automatic transmission comprising:
   a first plate having first and second holes;
   a second plate having third holes;
   a third plate formed integrally with the first plate, including legs, located between and spaced along an axis from the first and second plates, having recesses and fourth holes;
   short pinions, each short pinion supported on one of the second holes and one of the fourth holes, overlappable circumferentially by one of the legs; and
   long pinions, each long pinion supported on one of the first holes and one of the third holes, the first and second plates further including an axial spline that spaces the third plate from the second plate.

8. The carrier of claim 7 further comprising:
long pinion shafts directed axially and supported on one of the first holes and one of the third holes, each long pinion being supported on one of the long pinion shafts; and
short pinion shafts parallel to the long pinion shafts, supported on the first plate and the third plate, each short pinion being supported on one of the short pinion shafts.

9. The carrier of claim 8 wherein each long pinion shaft and each long pinion extends through one of the recesses.

10. The carrier of claim 7 further comprising:
a clutch secured to one of the first plate and the third plate for producing a one-way drive connection between a casing and said one of the first plate and third plate.

11. The carrier of claim 7 wherein each long pinion includes a first set of gear teeth for engaging a first sun gear, and a second set of gear teeth for engaging a ring gear.

12. The carrier of claim 7 wherein each short pinion includes a third set of gear teeth for engaging a second sun gear.

13. A method for a transmission carrier, comprising:
providing integral first and second plates including angularly spaced legs that circumferentially overlap an installed short pinion, and a third plate, the second plate having recesses;
installing each of multiple short pinions along a respective chordal path between two of the legs to respective positions radially below a respective leg;
installing each of multiple long pinions along a respective radial path between two of the legs.

14. The method of claim 13 wherein:
installing each of multiple short pinions further comprises installing each of four short pinions along a respective chordal path between two of the legs to a respective positions radially below a respective leg; and
installing each of multiple long pinions further comprises installing four long pinions.

15. The method of claim 13 further comprising:
supporting each short pinion on a respective first shaft secured to the first plate and the second plate; and
supporting each long pinion on a respective second shaft secured to the first plate and the third plate.

16. The method of claim 15 further comprising the steps of:
inserting a first bearing between each first shaft and a bore of the respective short pinion; and
inserting a second bearing between each second shaft and a bore of the respective long pinion.

17. The method of claim 15 further comprising the steps of:
securing each first shaft to the first plate and the second plate; and
securing each second shaft to the first plate and the third plate.

18. A method for assembling a carrier for an automatic transmission comprising:
providing integral first and second plates including angularly spaced legs that circumferentially overlap an installed short pinion, and a third plate, the second plate having recesses;
installing in the carrier each of multiple short pinions along a respective chordal path between two of the legs to a position radially below a respective leg;
supporting each short pinion on a respective first shaft that is secured to the first plate and the second plate;
installing in the carrier each of multiple long pinions along a respective radial path between two of the legs; and
supporting each long pinion on a respective second shaft that is secured to the first plate and the third second plate.

* * * * *